(12) United States Patent
Wang et al.

(10) Patent No.: US 9,751,155 B2
(45) Date of Patent: Sep. 5, 2017

(54) ON-BOARD CAMERA AND ITS MANUFACTURING METHOD

(71) Applicant: Suzhou Invo Automotive Electronics Co., Ltd., Suzhou, Jiangsu (CN)

(72) Inventors: Yajun Wang, Suzhou (CN); Tianwu Zeng, Suzhou (CN)

(73) Assignee: SUZHOU INVO AUTOMOTIVE ELECTRONICS CO., LTD. (CN)

( * ) Notice: Subject to any disclaimer, the term of this patent is extended or adjusted under 35 U.S.C. 154(b) by 0 days.

(21) Appl. No.: 14/786,638

(22) PCT Filed: Aug. 1, 2015

(86) PCT No.: PCT/CN2015/070353
§ 371 (c)(1),
(2) Date: Oct. 23, 2015

(87) PCT Pub. No.: WO2016/050008
PCT Pub. Date: Apr. 7, 2016

(65) Prior Publication Data
US 2016/0250713 A1    Sep. 1, 2016

(30) Foreign Application Priority Data
Sep. 30, 2014    (CN) .......................... 2014 1 0521605

(51) Int. Cl.
*B23K 26/03*    (2006.01)
*H04N 5/225*    (2006.01)
*B23K 26/21*    (2014.01)
*G03B 17/08*    (2006.01)

(52) U.S. Cl.
CPC ............ *B23K 26/032* (2013.01); *B23K 26/21* (2015.10); *G03B 17/08* (2013.01); *H04N 5/2252* (2013.01); *H04N 5/2253* (2013.01); *H04N 5/2254* (2013.01)

(58) Field of Classification Search
CPC .. B23K 26/032; H04N 5/2254; H04N 5/2252; H04N 5/2253; G03B 17/08
See application file for complete search history.

(56) References Cited

U.S. PATENT DOCUMENTS

| | | | |
|---|---|---|---|
| 2010/0097519 A1* | 4/2010 | Byrne | .................... B60R 1/00 348/373 |
| 2012/0019940 A1* | 1/2012 | Lu | ........................ G02B 7/025 359/819 |
| 2014/0002659 A1 | 1/2014 | Byne | |

FOREIGN PATENT DOCUMENTS

| | | |
|---|---|---|
| CN | 102025897 A | 4/2011 |
| CN | 203261403 U | 10/2013 |
| CN | 103782137 A | 5/2014 |
| CN | 103888673 | 6/2014 |
| CN | 104243786 A | 12/2014 |

* cited by examiner

*Primary Examiner* — Mekonnen Dagnew

(57) ABSTRACT

The present invention relates to an on-board camera, comprising a rear housing, a front housing, a lens mounted in the front housing and a sensor fixed on the rear housing; and its manufacturing method. The rear housing is welded to the front housing via a laser to form a seal cavity between the two housings to accommodate the lens and the sensor, and the focal length of the lens is adjusted by adjusting the distance between the sensor and the lens which is further adjusted by the welding height of the two housings.

10 Claims, 3 Drawing Sheets

ON-BOARD CAMERA AND ITS MANUFACTURING METHOD

BACKGROUND OF THE INVENTION

Technical Field

The present invention relates to a camera and its manufacturing method, and more specifically to an on-board camera and its manufacturing method.

Description of Related Art

Waterproofness and focusing are two major issues of on-board cameras. The method for making on-board camera generally includes dispensing type, extrusion type and ultrasonic welding type.

1. Dispensing Method

Disadvantages: (1). Glue fills the space between the lens and the housing body: During production, it is difficult to ensure the accuracy of optical axis and focal length, and frequently changing temperature and humidity affects the performance of glue in long-term use, as a result optical axis, focal length and waterproof property cannot be guaranteed; (2). A relatively high amount of glue is being used, requiring certain time period curing, therefore such method is not suitable for production line and results in poor efficiency. There is no guarantee that the space between housing body and the lens is being filled in every unit during mass production resulting in high defect rate.

2. Extrusion Method

As shown in FIG. 1, the product uses a compression rubber cushion to achieve waterproofness: The rear housing 5 and the front housing 4 connects to the compression gasket 2 via screws 1 to achieve waterproofness of the rear housing and the front housing. The rear housing 5 presses on the inner housing 6, the inner housing 6 presses on the lens 3, and the lens 3 and the front housing 4 press on the O-shaped ring 7 to achieve waterproofness of the front housing 4 and the lens 3. The product uses focal length setting mode: The sensor 8 is fixed to the inner housing 6, the lens 3 and the inner housing 6 are adjusted up and down through screw threads.

Disadvantages: (1) The compression gasket 2 is prone to deformation during assembly, leading to waterproof failure; (2) when the rear housing 5 presses the inner housing 6 downwards, the inner housing 6 deforms under stress, causing the relative distance between PCBA and lens (focal length) to change (out of focus), resulting in blurry imagery, poor stability and high defect rate seriously affect product quality; (3). the torque between the lens 3 and the inner housing 6 is difficult to control, resulting in debris being generated during production and dark spots on the image.

3. Ultrasonic Welding Method

As shown in FIG. 2, the sensor 12 is integrally attached to the front housing lens 13 via screws, and the rear housing 11 is integrally welded with the front housing lens 13 by ultrasonic means.

Disadvantages: (1). The integrated structure of the sensor 12 and the front housing lens 13 leads to failure to focus adjustment, and defect rate of focal length caused by part tolerance is high; (2). Since the integrated ultrasonic welding of the rear housing 11 and the front housing lens 13 is achieved by welding two parts through mechanical vibration to heat and melt plastic parts, the vibration may damage the electronic elements on the sensor 12.

BRIEF SUMMARY OF THE INVENTION

To overcome the shortcomings in the prior art, the objective of the present invention is to provide an on-board camera and its manufacturing method to address the technical problems relating to waterproofness and focus of traditional on-board cameras.

The present invention relates to an on-board camera, comprising a sensor, a lens, a rear housing and a front housing, wherein the lens is mounted in the front housing, wherein the sensor is fixed on the rear housing, wherein the rear housing is connected with the front housing via laser welding so as to form a seal cavity between the rear housing and the front housing to accommodate the lens and the sensor, wherein the focal length of the lens is adjusted through the distance between the sensor and the lens, and wherein the distance between the sensor and the lens is adjusted by the welding height of the rear housing and the front housing.

As a further improvement of the solution above, the sensor is attached and fixed onto the rear housing via screws.

As a further improvement of the solution above, the lens and the front housing form an integrated structure.

As a further improvement of the solution above, the lens and the front housing form a split structure, and the lens is assembled in the front housing.

As a further improvement of the solution above, the sensor includes a baseplate and a charge-coupled device arranged on the baseplate, and the baseplate is fixed on the rear housing.

The present invention also provides a manufacturing method of the on-board camera, wherein the on-board camera comprises a sensor, a lens, a rear housing and a front housing, wherein the lens is mounted in the front housing, the sensor is fixed on the rear housing, wherein the rear housing is connected with the front housing via laser welding so as to form a seal cavity between the rear housing and the front housing to accommodate the lens and the sensor, the focal length of the lens is adjusted through the distance between the sensor and the lens, and the distance between the sensor and the lens is adjusted by the welding height of the rear housing and the front housing; the manufacturing method comprises the following steps: the sensor is fixed on the rear housing, the rear housing is connected with the front housing containing the lens via laser welding so as to form a seal cavity between the rear housing and the front housing to accommodate the lens and the sensor, and during welding of the rear housing and the front housing, the welding height of the rear housing and the front housing is regulated in real time to adjust the focal length of the lens.

As a further improvement of the solution above, the sensor is attached and fixed onto the rear housing via screws.

As a further improvement of the solution above, the lens and the front housing form an integrated structure.

As a further improvement of the solution above, the lens and the front housing form a split structure, and the manufacturing method includes the following step: the lens is assembled in the front housing.

As a further improvement of the solution above, the sensor includes a baseplate and an electrical coupling device arranged on the baseplate, and the baseplate is fixed on the rear housing.

Comparing with the traditional dispensing type on-board camera, the present invention has the following advantages: simple manufacturing method, high production efficiency and high yield. Comparing with traditional extrusion type on-board camera, the advantages include: 1. The front housing and the rear housing are welded together to allow the omission of additional waterproof part and thoroughly prevent external water from entry into the body; 2. the baseplate is fixed with the rear housing, and the focal length is adjusted from time to time when welding the rear housing and the front housing. Comparing with the traditional ultrasonic welding type on-board camera, the present invention has the following advantages: 1. The tolerances of various parts can be eliminated by adjusting the laser welding height of the front housing and the rear housing to guarantee the focal length of each product can be adjusted to the optimal state; 2. the laser welding of the front housing and the rear housing is achieve by optical heating of the parts, so other parts will not be affected.

DETAILED DESCRIPTION OF THE INVENTION

To clarify the purpose, technical solution and the advantages of the present invention, the present invention is further illustrated in reference to the embodiments and the drawings below. It shall be understood that the embodiments herein are used for illustration purpose, rather than limiting the present invention.

Figure 1:
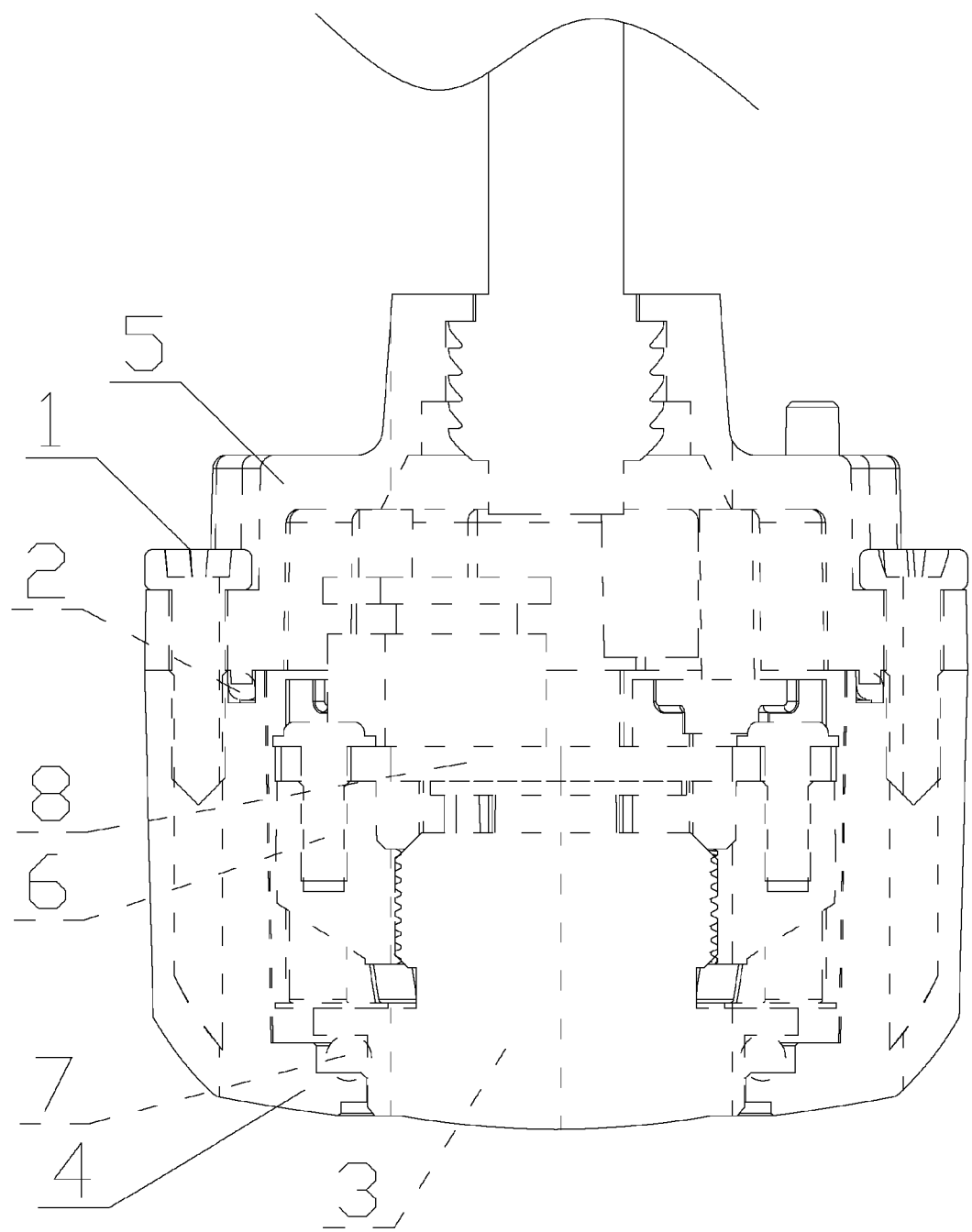
FIG. 1 is a schematic view of the structure of the traditional extrusion type on-board camera.
Figure 2:
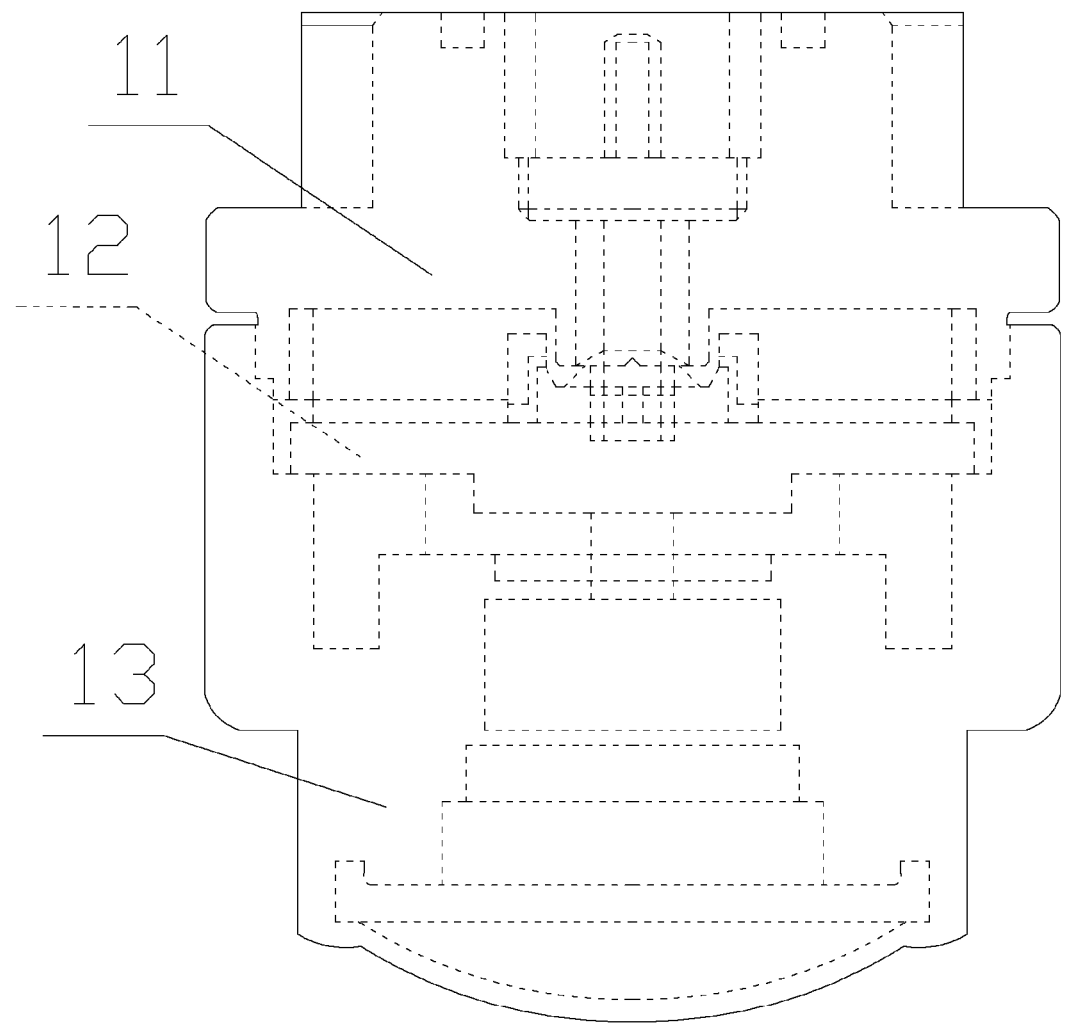
FIG. 2 is a schematic view of the structure of the traditional ultrasonic welding type on-board camera.
Figure 3:
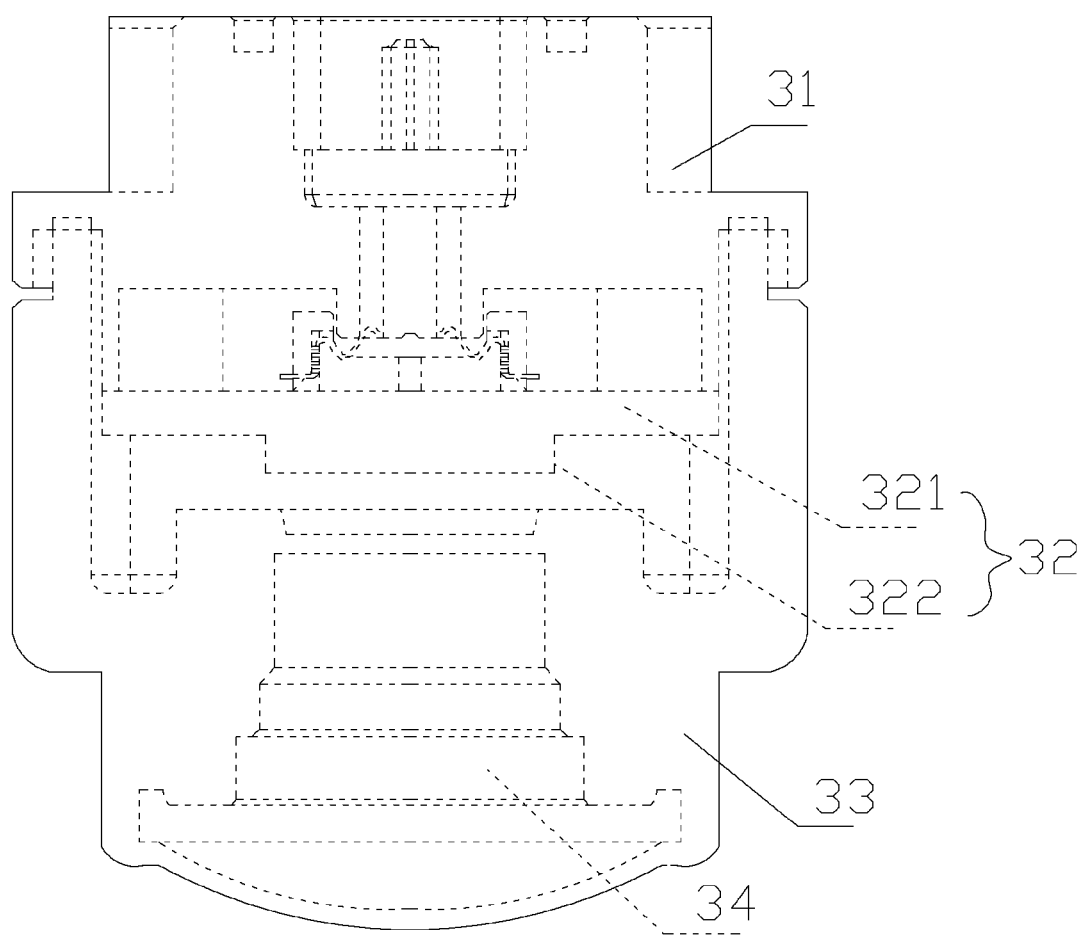
FIG. 3 is a schematic view of the structure of an on-board camera provided in a preferred embodiment according to the present invention.

FIG. 3 is a schematic view of a preferred embodiment of the structure of an on-board camera according to the present invention. The on-board camera comprises a sensor 32, a lens 34, a rear housing 31 and a front housing 33.

The lens 34 is mounted in the front housing 33, the lens 34 and the front housing 33 can be either an integrated structure or a split structure; when the lens 34 and the front housing 33 form a split structure, the lens 34 can be mounted in the front housing 33 during the production of the on-board camera.

The sensor 32 is fixed on the rear housing 31, and the sensor 32 can be attached onto the rear housing 31 via screws 35. The sensor 32 includes a baseplate 321 and a charge-coupled device (CCD) 332 arranged on the baseplate 321, and the baseplate 321 is fixed on the rear housing 31. For example, the baseplate 321 can be attached to the rear housing 31 via screws 35.

The rear housing 31 is connected with the front housing 33 via laser welding to form a seal cavity between the rear housing 31 and the front housing 33 to accommodate the lens 34 and the sensor 32. The focal length of the lens 34 can be adjusted through the distance between the sensor 32 and the lens 34, and the distance between the sensor 32 and the lens 34 can be adjusted by the welding height of the rear housing 31 and the front housing 33.

The manufacturing method of the on-board camera of the present invention comprises the following steps:

the sensor 32 is fixed on the rear housing 31. The lens 34 shall be mounted in the front housing 33 if the lens 34 and the front housing 33 are a split structure;

the rear housing 31 is connected with the front housing 33 via laser welding so as to form a seal cavity between the rear housing 31 and the front housing 33 to accommodate the lens 34 and the sensor 32. The focal length of the lens 34 is adjusted in real time by adjusting the welding height of the rear housing 31 and the front housing 33 during the process of welding the rear housing 31 and the front housing 33.

Adjusting the welding height of the rear housing 31 and the front housing 33 in real time can optimize the focal length of the lens 34.

In sum, the present invention has the following advantages comparing to the traditional dispensing type on-board camera: Simple manufacturing method, high production efficiency and high yield; comparing with traditional extrusion type on-board camera, the advantages include: 1. The front housing and the rear housing are welded together to allow the omission of additional waterproof part and thoroughly prevent external water from entering into the body, and 2. the baseplate 321 is fixed with the rear housing 31, and the focal length can be adjusted in real time during the process of welding the rear housing 31 and the front housing 33. The present invention has the following advantages comparing to the traditional ultrasonic welding type on-board camera,: 1. the tolerances of various parts can be eliminated by adjusting the laser welding height of the front housing and the rear housing to ensure that the focal length of each product can be optimized, and 2. Since the laser welding is used to weld the front housing to the rear housing, the optical heating can ensure that no other parts are affected by the heat.

The description above is the preferred embodiments of the present invention, but not intended to limit the present invention. Any changes, substitution and improvements made within the spirit and principle of the present invention shall fall in the protection scope of the present invention.

What is claimed is:

1. An on-board camera, comprising:
a sensor, a lens, a rear housing and a front housing, wherein the lens is disposed on the inner surface the front housing and has a focal length, wherein the sensor is disposed inside the rear housing, wherein the rear housing is connected with the front housing via laser welding, wherein a watertight seal cavity is formed between the rear housing and the front housing, wherein the lens and the sensor are completely enclosed by the rear housing and the front housing, wherein the focal length of the lens is adjusted through the-distance between the sensor and the lens, and wherein the distance between the sensor and the lens is adjusted by the welding height of the rear housing and the front housing.

2. The on-board camera according to claim 1, wherein the sensor is attached and fixed onto the rear housing via screws.

3. The on-board camera according to claim 1, wherein the lens and the front housing form an integrated structure.

4. The on-board camera according to claim 1, wherein the lens and the front housing form a split structure, and wherein the lens is assembled in inside the front housing.

5. The on-board camera according to claim 1, wherein the sensor includes a baseplate and a charge-coupled device arranged on the baseplate, and wherein the baseplate is fixed on the rear housing.

6. A manufacturing method of the on-board camera according to claim 1, wherein the manufacturing method comprises the following steps:
disposing a sensor inside a rear housing;
disposing a lens inside a front housing;
connecting the rear housing with the front housing via laser welding so as to form a watertight seal cavity between the rear housing and the front housing to completely enclose the lens and the sensor, regulating the welding height of the rear housing in real time during welding of the rear housing and the front housing, to adjust the focal length of the lens.

7. The manufacturing method of the on-board camera according to claim 6, wherein the sensor is attached and fixed onto the rear housing via screws.

8. The manufacturing method of the on-board camera according to claim 6, wherein the lens and the front housing form an integrated structure.

9. The manufacturing method of the on-board camera according to claim 6, wherein the lens and the front housing form a split structure, and the manufacturing method includes the following step: the lens is assembled inside the front housing.

10. The manufacturing method of the on-board camera according to claim 6, wherein the sensor includes a baseplate and a charge-coupled device arranged on the baseplate, and the baseplate is fixed on the rear housing.

* * * * *